APPARATUS FOR PROVIDING FIELD-RECOGNITION SIGNALS
FOR INTERLACE-DISPLAY VIDEO

Filed July 27, 1967 2 Sheets-Sheet 1

INVENTOR.
NORTON W. BELL

BY Raymond C. A. [signature]

ATTORNEY.

INVENTOR.
NORTON W. BELL

BY

ATTORNEY.

United States Patent Office 3,531,593
Patented Sept. 29, 1970

3,531,593

APPARATUS FOR PROVIDING FIELD-RECOGNITION SIGNALS FOR INTERLACE-DISPLAY VIDEO

Norton W. Bell, Pasadena, Calif., assignor to Bell & Howell Company, Chicago, Ill., a corporation of Illinois
Filed July 27, 1967, Ser. No. 656,574
Int. Cl. H04n 5/06
U.S. Cl. 178—69.5 4 Claims

ABSTRACT OF THE DISCLOSURE

An apparatus for providing field-recognition signals for interlace-display video images includes a gate for providing, in response to gating signals and horizontal sync signals, pulses which identify one field for each image frame. The gating signals are provided in response to a comparison of relatively undelayed vertical sync signals with vertical sync signals that have been delayed by amounts of time corresponding to intervals between successive horizontal sync signals.

CROSS-REFERENCES TO RELATED APPLICATIONS

The present application is related to:

(1) Pat. No. 3,440,341, entitled "Two-Color Display from Line Sequential Color Recording," by James Reekie and Edward G. Thurston, issued Apr. 22, 1969, and assigned to the present assignee;

(2) Pat. No. 3,456,069, entitled "Color Synchronization for Two Color per Line Television Systems," by Edward G. Thurston, issued July 15, 1969, and assigned to the present assignee;

(3) Pat. application S. N. 656,573, entitled "Electronic Signal Processing Systems," filed July 27, 1967, by Norton W. Bell and Bert H. Dann, and assigned to the present assignee.

BACKGROUND OF THE INVENTION

Field of the invention

The subject invention relates to video systems and, more particularly, to apparatus for providing field-recognition signals for interlace-display video signals.

Description of the prior art

Apparatus for providing field-recognition signals are well known in the art. In general, these apparatus operate fairly well if the signals which control their operation are of good quality. However, this requirement is not always readily met in practice.

To name an example, the signals which are used to drive frame or field recognition circuits in television equipment, such as waveform monitors or color sequencing apparatus, often suffer from hum, tilt and other signal degradations which impair circuit performance and which are difficult to correct.

There exists a need for apparatus for providing field-recognition signals which are capable of performing satisfactorily despite signal degradations of the above mentioned type.

SUMMARY OF THE INVENTION

The subject invention and its various embodiments disclosed herein satisfy the need just outlined, as will become apparent as this description proceeds.

The invention resides in apparatus for providing field-recognition signals for interlace-display video images contained in signal trains including horizontal and vertical sync signals, and including video information in a series of image frames each of which is composed of interlace-display first and second fields. According to the invention, this apparatus comprises, in combination, first means for providing in response to gating signals and horizontal sync signals pulses identifying one of the first and second fields of each frame, second means for receiving vertical sync signals, third means connected to the second means for delaying the received vertical sync signals by amounts of time corresponding to intervals between successive horizontal sync signals, and fourth means connected to said first, second and third means for comparing delayed vertical sync signals provided by said third means with vertical sync signals received by said second means to provide a pulse for each field, and for providing said gating signals for said first means by suppressing alternate ones of said pulses provided by said comparison of said delayed vertical sync signals provided by said third means and said vertical sync signal received by said second means.

BRIEF DESCRIPTION OF THE DRAWINGS

The accompanying drawings illustrate, by way of example, a family of explanatory curves and preferred embodiments of the subject invention, together with modifications thereof.

More specifically.

DESCRIPTION OF THE PREFERRED EMBODIMENTS

Figure 1:
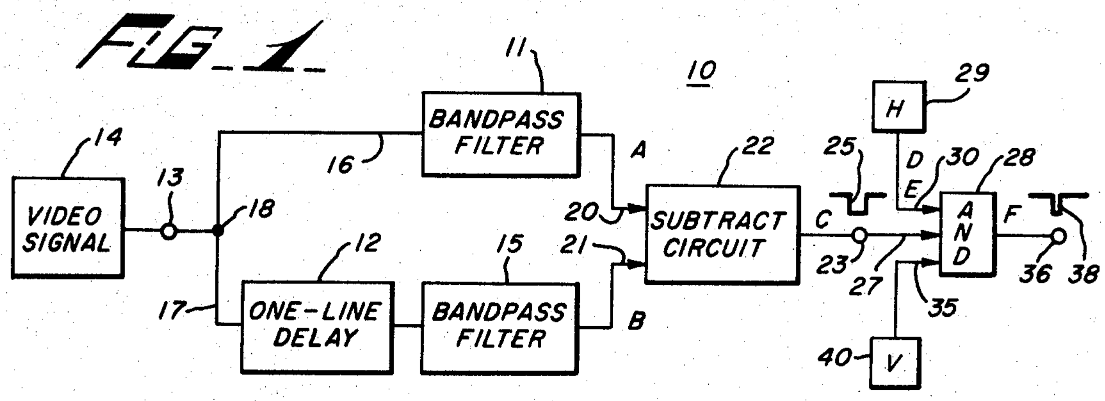
FIG. 1 is a block diagram of a field-recognition signal generating apparatus in accordance with a preferred embodiment of the invention.

The apparatus 10 of FIG. 1 has a bandpass filter 11 and a delay line 12 connected to an input terminal 13 which is supplied with a composite video signal from a circuit 14. This circuit may, for instance, be the video-frequency amplifier of a television receiver (see Martin, Technical Television, Prentice-Hall, 1962, p. 479, hereinafter referred to as "Martin"). Other composite video signal sources, such as those found in the playback section of video tape recorders, are also suitable for present purposes.

Figure 2:
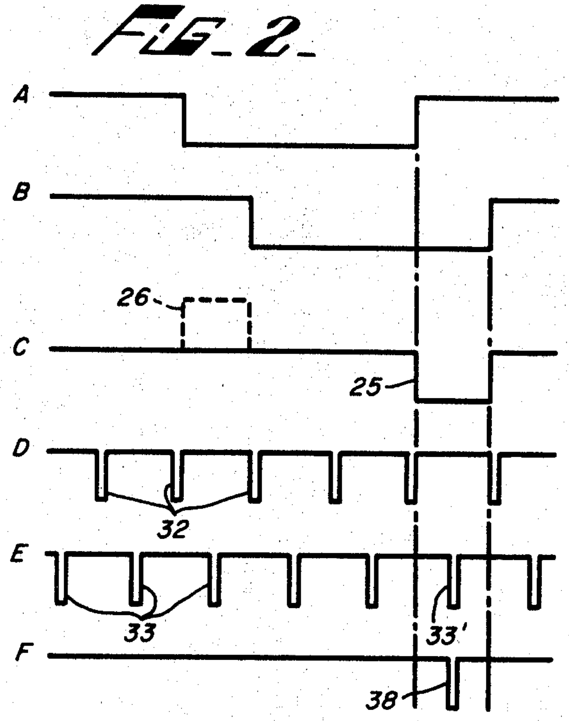
FIG. 2 schematically illustrates a family of waveforms A through F occurring in the apparatus of FIG. 1.

The bandpass filter 11 is designed to pass vertical sync signals, one of which is schematically illustrated at A in FIG. 2. The delay line 12 is designed to impose on the signal received at input 13 a delay corresponding to the duration provided for one horizontal line of the television image.

A bandpass filter 15 connected to the line 12 is designed to extract vertical sync pulses from the delayed signal provided by that delay line 12. One delayed vertical sync signal is schematically illustrated at B in FIG. 2. Alternatively, it would also be possible to provide one bandpass filter for both of the signal channels 16 and 17 shown in FIG. 1. This common filter, which would take the place of the illustrated filters 11 and 15, would be inserted between the input terminal 13 and the junction 18. In many applications, use of two filters 11 and 15 is, however, preferred, since the delay line 12 can generally be of lesser quality if it is connected ahead of, as distinguished from subsequent to, a bandpass filter, as certain error terms introduced by the delay line can then be more readily tolerated.

If desired, the input singals supplied to the terminal 13 may in the alternative be derived from the sync pulse separator (see Martin, p. 220) or vertical sync pulse integrator (see Martin, p. 239) of a television receiver or video tape recorder. In this case, the bandpass filters 11 and 15 may be deleted.

The outputs of the signal channels 16 and 17 are, respectively, connected to input terminals 20 and 21 of a subtraction circuit 22 to which the waveforms A and B are applied. The circuit 22 subtracts one of these waveforms from the other and passes the difference signals of one polarity to a terminal 23.

One of these difference signals is schematically shown at 25 in the waveform C of FIG. 2. It will be noted that the beginning of the pulse 25 coincides generally with the end of the vertical sync pulse shown by waveform A, while the end of pulse 25 coincides generally with the end of the delayed vertical sync pulse shown by waveform B. The dotted outline 26 indicated in waveform C represents a difference pulse which has been suppressed in the circuit 22, because it is of a polarity opposite to that of pulse 25.

The terminal 23 is connected to an input 27 of an AND circuit 28. A source 29 of horizontal sync pulses, such as the horizontal sync pulse differentiator (see Martin, p. 239) of a television receiver or video tape recording is connected to an input 30 of the AND circuit 28. The particular television apparatus or video tape recorder (not shown) is designed to process video signals for interlace display (see Martin, pp. 5 and 6), and the source 29 provides first horizontal sync pulses, some of which are shown schematically at 32 in waveform D of FIG. 2, and seocnd horizontal sync pulses, some of which are shown schematically at 33 in waveform E of FIG. 2. The first horizontal sync pulses are for the horizontal synchronization of the first field, while the second horizontal sync pulses are for the synchronization of the second field of each frame of the interlace-display video images.

The aspect of the subject invention presently under consideration exploits the fact that with interlaced video scanning the vertical sync pulses are displaced by half a horizontal line with respect to the horizontal sync pulses of the second field of each frame (compare waveform E with waveform A). If this fact is implemented into the apparatus of FIG. 1, it will be seen that there is one horizontal sync pulse for the second field, namely the pulse 33' of the waveform E of FIG. 2, that coincides in time with the difference pulse 25 shown in waveform C. This pulse 33' occurs at the beginning of the second field scanning process.

Accordingly, the pulses 25 and 33' in effect identify or index the second field of each frame and may thus be exploited for field recognition purposes. This field recognition principle is not disturbed by the horizontal sync pulses 32 for the first field, since these pulses do not coincide with the difference pulse 25, as is seen from a comparison of the waveforms C and D of FIG. 2. On the other hand, it will be understood that the field recognition principle just described may also be used for frame counting or signaling purposes, since there will be only one coincidence of the pulses 25 and 33' for each frame.

For the moment the lowermost input 35 of the AND circuit 28 will be ignored, and it will be assumed that this circuit will provide a signal at its output terminal 36 when both the inputs 27 and 30 are energized. In terms of circuit logic as applied to the waveforms C, D and E, it may be said that the AND circuit 28 will gate a horizontal sync pulse from its input 30 to its output 36 when a coinciding difference or gating pulse 25 appears at its input 27. In the illustrated embodiments, the pulse thus gated is the horizontal sync pulse 33', which results in the provision of a field-recognition indexing pulse 38 for each second field (see waveform F of FIG. 2) at the output 36. While this pulse has been shown as negative-going, it should be understood that the AND circuit 28 may also be designed to produce a positive-going output in response to negative-going inputs.

In some applications, there exists a danger that the video contents of television signals may provide error terms that ultimately cause the AND circuit 28 to give off spurious signals. To preclude this danger, the And circuit 28 is provided with the previously mentioned input terminal 35, and is designed to provide a field-recognition signal only if this terminal 35 is energized in addition to the other input terminals 27 and 30. The energization of the input terminal 35 takes place during a predetermined interval between the occurrence of adjacent video contents of the television signal.

To implement this principle, a pulse from a source 40 is applied to the input terminal 35 during the interval just mentioned. For a proper functioning of the AND circuit 28, the effectiveness of this pulse at the terminal 35 must encompass as to time the occurrence of the pulses 25 and 33' shown in FIG. 2. It has been found that the vertical sweep section of television receivers (see Martin, pp. 349 et seq.) may serve as the pulse source 40, since vertical sync pulses provided by this section occur after an interval of some three horizontal lines from the end of preceding fields (see Martin, p. 11) and persist sufficiently to encompass the occurrence of the pulses 25 and 33'.

Figure 3:
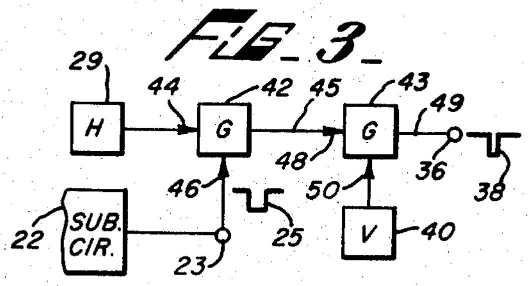
FIGS. 3 through 5 are block diagrams of modifications of the apparatus of FIG. 2.
Figure 4:
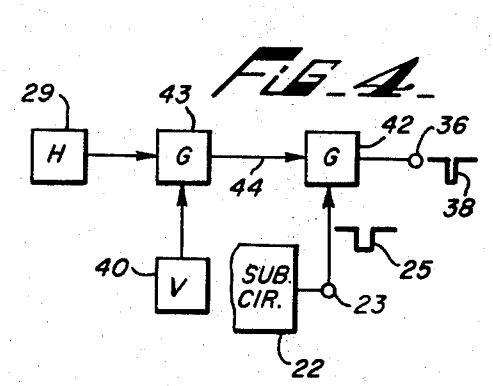
Figure 5:
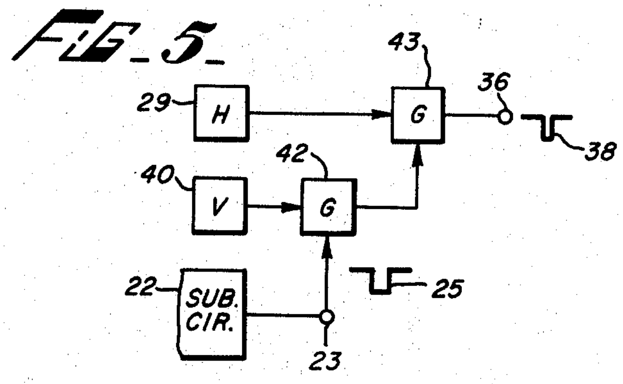

FIGS. 3 to 5 show alternative ways of exploiting the above mentioned benefits of the pulses provided by the source 40. The embodiments illustrated in these figures employ two gates 42 and 43. The gate 42 has a signal input 44, a signal output 45 and a gating signal input 46. A signal is gated from the input 44 to the output 45 when a gating signal is present at the gate input 46. Similarly, the gate 43 gates a signal from an input 48 to an output 49 when a gating signal is present at its gate input 50. Apart from the circuitry between the terminals 23 and 36, the structure of the apparatus of the embodiments of FIGS. 3 to 5 may be the same as that of the embodiment of FIG. 1. The gates 42 and 43 may, for example, be two-input AND elements.

According to FIG. 3, the difference signal 25 appearing at the output 23 of the subtraction circiut 22 is applied to the gate input 46 to cause the gate 42 to pass the horizontal sync pulse 33' from the previously described source 29 and input 44 to its output 45. The pulse thus gated is thereupon applied to the input 48 of the gate 43. This input also will receive those spurious signals that may occur during the video portions of the television signal, as mentioned above. These spurious signals are eliminated by the gate 43 which only produces signals at its output 49 when the above mentioned source 40 applies its pulses to the gating signal input 50. The previously described field-recognition pulse 38 then appears at the output terminal 36.

The embodiment of FIG. 4 serves the purpose of limiting the occurrence of horizontal sync signals at the input 44 of gate 42 to intervals between video contents of the television signal. To this end, the gate 43 is interposed between the horizontal sync source 29 and the gate 42, so that horizontal sync signals can only reach the gate 42 in response to the pulses supplied by the source 40. This eliminates the possibility that spurious signals from the subtraction circuit 22 could cause the gate 42 to pass horizontal sync pulses in response to error terms produced by the television signal image contents.

According to FIG. 5, the horizontal sync pulses from the source 29 are directly applied to the gate 43. However, this gate can only pass pulses when it is activated by the output of the gate 42 which, in turn, is controlled by the concurrence of the pulses 25 from the subtraction circuit 22 and the previously defined pulses from the source 40.

In practice, factors such as prevailing pulse levels, available components, resulting circuit costs and complexity, will determine which one of the solutions as among those shown at 28 in FIG. 1 or illustrated in FIGS. 3 to 5, will be employed in a given application.

Figure 6:
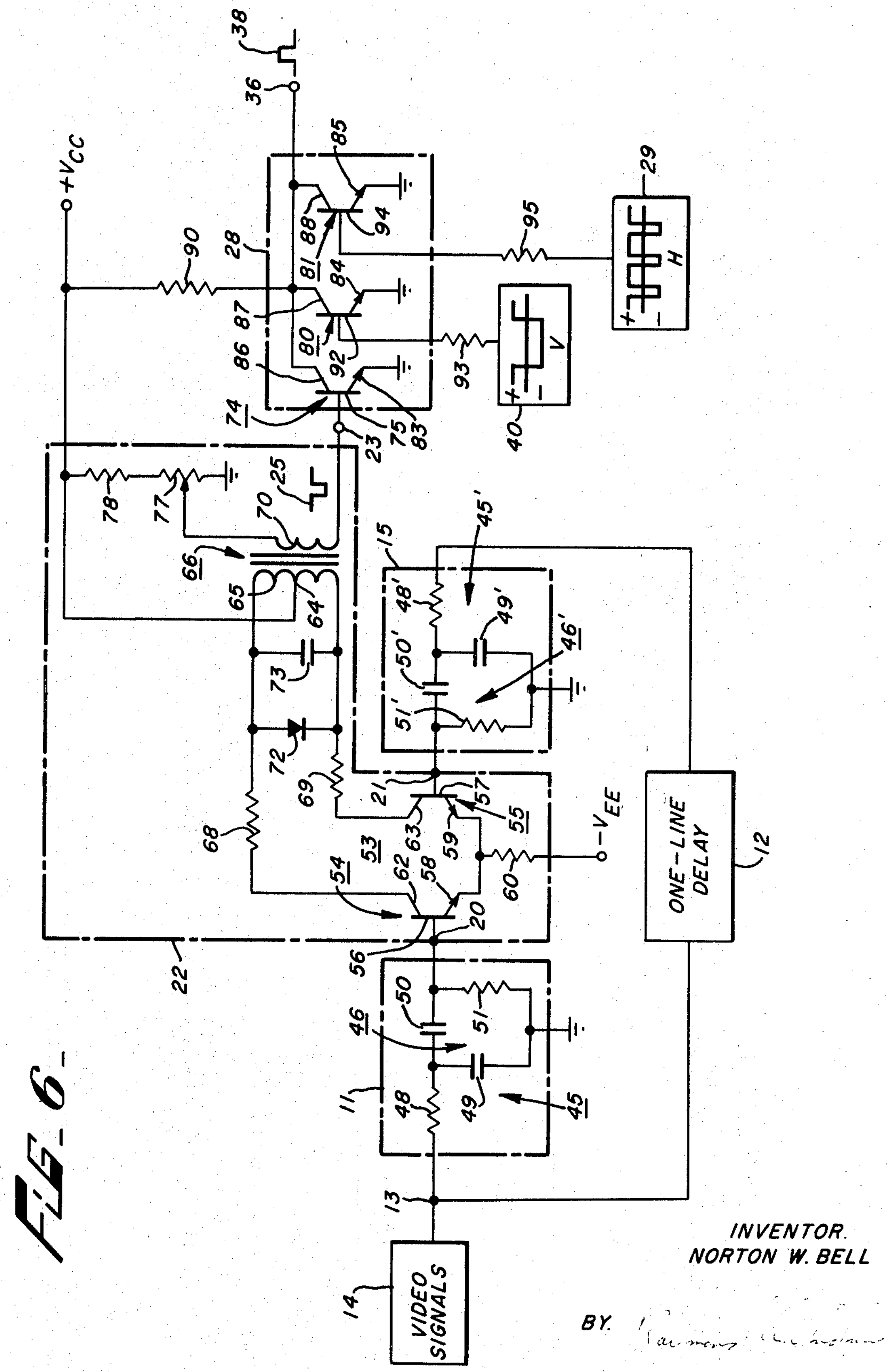
FIG. 6 is a preferred circuit diagram of the apparatus according to FIG. 1.

FIG. 6 is a preferred circuit diagram of the embodiment shown in FIG. 1. For an understanding of the broader aspects and functions of the apparatus of FIG. 6, reference should be had to the block diagram of FIG. 1 and to the above description of this diagram and its functions.

As in FIG. 1, the composite video signal source 14 is in FIG. 6 connected to the bandpass filter 11 and, through a conventional one-line delay line 12 to the bandpass filter 15. This filter 15 is composed of low-pass and high-pass sections 45 and 46 which are designed to pass jointly a frequency band occupied by the vertical sync pulse desired to be extracted from the composite video signal applied to terminal 13. When working with NTSC video signals, a passband extending, for example, from about 1 kHz. to about 6 kHz. has been found satisfactory for each of the filters 11 and 15.

The filter section 45 is composed of a resistor 48 and a capacitor 49, while the filter section 46 is composed of a capacitor 50 and a resistor 51, all interconnected as shown. The structure of the filter 15 may be identical to that of the filter 11, as is apparent from the primed reference numerals which, number for number, designate in the filter 15 components that are identical as among the filters 11 and 15.

The output of the filter 11 is connected to the input terminal 20 of the subtraction circuit 22, while the output of the filter 15 is connected to the input terminal 21 of that subtraction circuit.

The subtraction circuit 22 includes in the illustrated embodiment a differential amplifier 53 which has a pair of transistors 54 and 55. These transistors have their bases 56 and 57 connected, respectively, to the terminals 20 and 21. In this manner, the transistor 54 is controlled by the vertical sync pulses extracted by the filter 11 (see waveform A, FIG. 2), and the transistor 55 is controlled by the delayed vertical sync pulses provided by the delay line 12 and the filter 15 (see waveform B, FIG. 2).

The emitters 58 and 59 of the transistors 54 and 55 are negatively biased through a resistor 60. The transistor collectors 62 and 63 are positively biased through the center tap 64 of the primary winding 65 of a transformer 66 and through resistors 68 and 69. The terminals marked $+V_{CC}$ and $-V_{EE}$ may, respectively, be connected to the positive and to the negative terminals of a source of electric current (not shown) which has a grounded center.

If both transistors 54 and 55 are equally conducting, their collector currents cancel each other, as seen from the secondary winding 70 of the transformer 66. On the other hand, a pulse of the type generally shown at 25 in waveform C of FIG. 2 is produced in the winding 70 if the transistor 55 is conducting, while the transistor 54 is non-conducting (compare waveforms A and B in FIG. 2). To eliminate the occurrence of a pulse of the polarity generally indicated at 26 in the waveform of FIG. 2, a unidirectional current conducting device 72, which may be a diode, is connected across the primary winding 65.

A capacitor 73 connected in parallel to the primary winding 65 resonates the transformer 66 so as to shorten the length of the pulse 25. This further improves the performance of the apparatus of the subject invention, since it removes the lateral edges of the pulse 25 from lateral edges of the two timewise adjacent horizontal sync pulses for the first field (see waveform D, FIG. 2).

A transistor 74 serves to clip the rounded tops of the output pulses of the secondary winding 70. To this end, the transistor base 75 is connected through the winding 70, a pulse trim potentiometer 77 and a resistor 78 to the terminal $+V_{CC}$. The transistor 74 is included in an AND element 28 which also contains transistors 80 and 81.

These transistors 74, 80 and 81 have emitter electrodes 83, 84 and 85 which are grounded, and collector electrodes 86, 87 and 88 which are connected to the terminal $+V_{CC}$ through a resistor 90, and which are also connected to the output terminal 38.

The transistor 80 has a base electrode 92 which, through a resistor 93, receives pulses from the above mentioned vertical pulse source 40. Similarly, the transistor 81 has a base electrode 94 which, through a resistor 95, receives pulses from the above mentioned horizontal pulse source 29.

As is indicated in the boxes 29 and 40 in FIG. 6, the horizontal pulses and the vertical pulses supplied by these sources extend from positive to negative values. As long as both or either of the base electrodes 92 and 94 are biased positively the output terminal 36 is connected to ground through both or either of the transistors 80 and 81 so that no pulse can appear at the terminal 36.

On the other hand, a positive-going field-recognition pulse 38 appears at the output terminal 36 when there is a negative-going difference pulse 25 at the transistor base 75, a negative-going vertical pulse from the source 40 and the transistor base 92, and a negative-going horizontal pulse from the source 29 at the transistor base 94.

Based on the principles described above, the apparatus of FIG. 6 provides only one field-recognition pulse 38 per each image frame. This pulse occurs in coincidence with the horizontal sync pulse 33' shown in waveform E of FIG. 2 at the beginning of each second image field. In terms of circuit logic, it may also be said that the apparatus of FIG. 6 gates only the pulse 33' as among all horizontal sync pulses of an image frame.

The apparatus of FIG. 6 has been found to be particularly insensitive to hum, tilt and noise degradations in the applied composite video signal. This is primarily brought about by the combined action of the bandpass filters 11 and 15 and the differential amplifier 53. This degradation insensitivity is of advantage in television receiver circuits, particularly in those of commercial quality, and is of high importance in video tape recorder applications, notably those pertaining to the home entertainment and relatively localized educational field.

The apparatus of the type shown herein can also be used very advantageously in the signal processing systems disclosed in the initially mentioned copending applications. For instance, the apparatus of FIG. 6 can be employed in the color gate sequencer of the initially mentioned Bell and Dann application. To name a more specific example, the terminal 36 of the apparatus of FIG. 6 may be connected to the P-pulse input of the sequencer 225 of the switched color demodulator system according to FIG. 1 of that Bell and Dann application. The transistor 81 shown in FIG. 6 may then be omitted, as its function is performed by the AND circuits 233 and 235 shown in that FIG. 1.

I claim:

1. Apparatus for providing field-recognition signals for interlace-display video images contained in signal trains including horizontal and vertical sync signals, and including video information in a series of image frames each of which is composed of interlace-display first and second fields, comprising in combination:

(a) first means for providing in response to gating signals and horizontal sync signals pulses identifying one of said first and second fields of each frame;

(b) second means for receiving said vertical sync signals;

(c) third means connected to said means for delaying said vertical sync signals by amounts of time corresponding to intervals between successive horizontal sync signals; and (d) fourth means connected to said first, second and third means for comparing delayed vertical sync signals provided by said third means with vertical sync signals received by said second means to provide a pulse for each field, and for providing said gating signals for said first means by suppressing alternate ones of said pulses provided by said comparison of said delayed vertical sync signals provided by said third means and said vertical sync signal received by said second means.

2. Apparatus as claimed in claim 1, wherein said fourth means include means for suppressing pulses corresponding to the first fields of the image frames, whereby there remains one field-recognition pulse for each second field.

3. Apparatus as claimed in claim 1, wherein said second means include filter means for extracting said vertical sync signals from said signal trains.

4. Apparatus as claimed in claim 1, including fifth means connected at least to said first means and responsive to vertical sync signals for confining the provision of field-identifying pulses to intervals between video information in said signal trains.

References Cited

UNITED STATES PATENTS

| | | | |
|---|---|---|---|
| 2,254,435 | 9/1941 | Loughren ---------- | 178—7.55 |
| 2,354,032 | 7/1944 | Lyman ------------ | 178—7.55 |
| 3,440,341 | 4/1969 | Reekie et al. ------ | 178—5.42 |

ROBERT L. GRIFFIN, Primary Examiner

A. H. EDDLEMAN, Assistant Examiner

U.S. Cl. X.R.

178—7.5